(12) United States Patent
Kaneko et al.

(10) Patent No.: US 12,090,448 B2
(45) Date of Patent: Sep. 17, 2024

(54) CARBON MATERIAL AND METHOD FOR PRODUCING CARBON MATERIAL

(71) Applicants: TAKAGI Co., Ltd., Kitakyushu (JP); Shinshu University, Matsumoto (JP)

(72) Inventors: Katsumi Kaneko, Nagano (JP); Toshio Takagi, Kitakyushu (JP); Yasushi Shimizu, Kitakyushu (JP); Stevic Dragana, Nagano (JP); Katsuyuki Murata, Kitakyushu (JP)

(73) Assignees: TAKAGI Co., Ltd., Kitakyushu (JP); Shinshu University, Matsumoto (JP)

( * ) Notice: Subject to any disclaimer, the term of this patent is extended or adjusted under 35 U.S.C. 154(b) by 0 days.

(21) Appl. No.: 17/603,274

(22) PCT Filed: Mar. 1, 2021

(86) PCT No.: PCT/JP2021/007760
§ 371 (c)(1),
(2) Date: Oct. 12, 2021

(87) PCT Pub. No.: WO2021/177244
PCT Pub. Date: Sep. 10, 2021

(65) Prior Publication Data
US 2022/0194800 A1 Jun. 23, 2022

(30) Foreign Application Priority Data
Mar. 5, 2020 (JP) .................. 2020-038103

(51) Int. Cl.
*B32B 9/00* (2006.01)
*B01D 71/02* (2006.01)
(Continued)

(52) U.S. Cl.
CPC ........ *B01D 71/0211* (2022.08); *C01B 32/178* (2017.08); *C01B 32/194* (2017.08);
(Continued)

(58) Field of Classification Search
CPC ....... Y10T 428/30; B82Y 30/00; B82Y 40/00; C01B 32/194; C01B 32/178; C01B 2202/02; C01B 2202/26
(Continued)

(56) References Cited

U.S. PATENT DOCUMENTS

2011/0104507 A1  5/2011  Choi et al.
2013/0074920 A1*  3/2013  Echegoyen ............ B82Y 30/00
                                              977/948
(Continued)

FOREIGN PATENT DOCUMENTS

CN  103732534 A  4/2014
CN  104203835 A  12/2014
(Continued)

OTHER PUBLICATIONS

CN 104204796, Miller S. (Dec. 10, 2014) translation.*
(Continued)

*Primary Examiner* — Daniel H Miller
(74) *Attorney, Agent, or Firm* — Studebaker & Brackett PC

(57) ABSTRACT

The present disclosure provides a carbon material including a carbon-containing layer having opening parts; and a solid body provided so as to cover the opening parts of the carbon-containing layer, in which the solid body has hole parts communicating with the opening parts.

17 Claims, 10 Drawing Sheets

(51) Int. Cl.
*C01B 32/178* (2017.01)
*C01B 32/194* (2017.01)
*B82Y 40/00* (2011.01)

(52) U.S. Cl.
CPC .......... *B82Y 40/00* (2013.01); *C01B 2202/02* (2013.01); *C01B 2202/26* (2013.01); *C01P 2004/13* (2013.01); *C01P 2004/64* (2013.01); *C01P 2004/80* (2013.01); *C01P 2006/12* (2013.01); *C01P 2006/14* (2013.01)

(58) Field of Classification Search
USPC ........................................................ 428/408
See application file for complete search history.

(56) References Cited

U.S. PATENT DOCUMENTS

| | | | |
|---|---|---|---|
| 2013/0192460 A1* | 8/2013 | Miller | B01D 53/22 977/734 |
| 2014/0037944 A1* | 2/2014 | Dichtel | B01J 20/226 428/411.1 |
| 2019/0070566 A1 | 3/2019 | Kidambi et al. | |

FOREIGN PATENT DOCUMENTS

| | | |
|---|---|---|
| CN | 106463603 A | 2/2017 |
| CN | 108602046 A | 9/2018 |
| JP | 2008001570 A | 1/2008 |
| JP | 2013-536077 A | 9/2013 |
| JP | 2014-076909 A | 5/2014 |
| JP | 2015-516286 A | 6/2015 |
| JP | 2016-163858 A | 9/2016 |
| JP | 2017-500195 A | 1/2017 |
| JP | 2018-529612 A | 10/2018 |
| JP | 2019-507715 A | 3/2019 |
| WO | WO 2012/027148 | 3/2012 |
| WO | WO 2013/138137 | 9/2013 |
| WO | WO 2015/089130 | 6/2015 |
| WO | WO 2015/198980 | 12/2015 |
| WO | WO 2017/023378 | 2/2017 |
| WO | WO 2017/116657 | 7/2017 |

OTHER PUBLICATIONS

International Preliminary Report on Patentability for corresponding International Application No. PCT/JP2021/007760, mailed Sep. 15, 2022; 5 pages.
International Search Report for counterpart International Application No. PCT/JP2021/007760 mailed Apr. 27, 2021; 6 pages.
Written Opinion for counterpart International Application No. PCT/JP2021/007760 mailed Apr. 27, 2021; 4 pages.
Kruusenberg et al., "Oxygen Electroreduction on Multi-Walled Carbon Nanotubes Supported Metal Phthalocyanines and Porphyrins in Acid Media," International Journal of Electrochemical Science, vol. 8, Jan. 31, 2013, pp. 1057-1066.
Kruusenberg et al., "Oxygen Electroreduction on Multi-Walled Carbon Nanotube Supported Metal Phthalocyanines and Porphyrins in Alkaline Media," Journal of Nanoscience and Nanotechnology, vol. 13, No. 1, Jan. 31, 2013, pp. 621-627, Copyright 2013 by American Scientific Publishers in the United States.
Extended European Search Report for related European Application No. 211765321, dated Oct. 26, 2022; 19 bages.

* cited by examiner (a)

(b)

CARBON MATERIAL AND METHOD FOR PRODUCING CARBON MATERIAL

CROSS REFERENCE

This application is a United States national phase application of co-pending international patent application number PCT/JP2021/007760, filed Mar. 1, 2021, which claims priority to Japanese patent application number 2020-038103, filed Mar. 5, 2020, the entire disclosures of which are hereby incorporated herein by reference.

TECHNICAL FIELD

The present disclosure relates to a carbon material and a method for producing a carbon material.

BACKGROUND ART

Graphene, carbon nanottube, carbon nanohorn, and the like are expected to be applied to various use applications due to their mechanical characteristics and electrical characteristics. For example, studies intended to form fine water-passing holes in graphene and utilize this as a filter for a desalination treatment or a deionization treatment, and studies intended to form fine holes in carbon nanotube and carbon nanohorn and utilize them as molecule sieves for gas separation, have been carried out.

In Patent Literature 1, there is described a method for perforating graphene, the method including a step of exposing a stream of gas to atmospheric pressure plasma and producing an activated gas flow separated from the atmospheric pressure plasma in the downstream of the atmospheric pressure plasma; a step of directing the activated gas flow separated from the atmospheric pressure plasma toward a graphene sheet; and a step of perforating the graphene sheet with the activated gas flow, in which the stream of gas has an activated gas at a certain concentration, and the activated gas is selected from one of oxygen, nitrogen, or a combination thereof.

In Patent Literature 2, there is described a method for perforating a sheet of a graphene-based material, the method including positioning the sheet of a graphene-based material, which includes a single-layer graphene having at least two surfaces, and a non-graphenic carbon-based material formed on the single-layer graphene; coating more than 10% and less than 80% of the surfaces of the single-layer graphene with the non-graphenic carbon-based material; and exposing the sheet of a graphene-based material to ions characterized by an ion energy ranging from 10 eV to 100 keV and a fluence ranging from $1 \times 10^{13}$ ions/cm$^2$ to $1 \times 10^{21}$ ions/cm$^2$.

CITATION LIST

Patent Literature

Patent Literature 1: Japanese Unexamined Patent Publication No. 2013-536077
Patent Literature 2: Japanese Unexamined Patent Publication No. 2018-529612

SUMMARY OF INVENTION

Technical Problem

However, graphene and the like have a hexagonal lattice structure composed of a plurality of carbon atoms as a basic configuration, and the chemical environment of the surface thereof is uniform. Therefore, the control of hole boring may be difficult. Furthermore, with regard to the conventional technologies for perforating graphene and the like, cracks and the like may occur in graphene during perforation or after perforation, and it may be difficult to suppress spreading of the cracks.

It is an object of the present disclosure to provide a carbon material having pores and having excellent mechanical strength, in which spreading of cracks or the like is suppressed. It is another object of the present disclosure to provide a production method for producing a carbon material such as described above.

Solution to Problem

According to an aspect of the present disclosure, a carbon material including a carbon-containing layer having opening parts; and a solid body provided thereon so as to cover the opening parts of the carbon-containing layer, the solid body having hole parts communicating with the opening parts.

The carbon material is such that since the carbon-containing layer has opening parts, and a solid body is provided on the opening parts, spreading of cracks or the like is suppressed, and the carbon material has excellent mechanical strength.

The carbon-containing layer may be a monomolecular layer.

The carbon-containing layer may contain at least one selected from the group consisting of graphene and graphene oxide.

The solid body may contain at least one selected from the group consisting of phthalocyanine, porphine, porphyrin, corrole, chlorin, and derivatives thereof.

A plurality of the solid bodies may be arranged on the carbon-containing layer.

A plurality of the solid bodies may be arranged regularly on the carbon-containing layer.

According to another aspect of the present disclosure, there is provided a method for producing a carbon material, the method including a first step of preparing a dispersion liquid including a carbon-containing layer, a metal complex, and a solvent, reducing the content of the solvent from the dispersion liquid, and thereby forming a composite having the metal complex adhered to the surface of the carbon-containing layer; a second step of heat-treating the composite and providing opening parts in the carbon-containing layer in the vicinity of the metal atoms constituting the metal complex; and a third step of removing at least a portion of the metal atoms constituting the metal complex and then forming a solid body having hole parts communicating with the opening parts.

Since the method for producing a carbon material has a step of adhering a metal complex to a carbon-containing layer and forming opening parts by utilizing the metal element of the metal complex, formation of opening parts may be carried out under relatively mild conditions, and a carbon material having excellent mechanical strength, in which spreading of cracks or the like is suppressed, may be provided.

The heating temperature for the second step may be 200° C. to 450° C. By setting the heating temperature for the second step to be in the above-described range, it is easier to control the opening diameter and the like of the opening parts, and generation of cracks may be suppressed more sufficiently.

The second step may be a step of providing opening parts in the carbon-containing layer in the vicinity of the metal atoms constituting the metal complex, by allowing the complex to lie co-present with ammonium nitrate and heat-treating the mixture at 200° C. to 280° C. in a vacuum.

The third step may be a step of removing at least a portion of the metal atoms by an acid treatment. When the third step is carried out by an acid treatment, removal of the metal atoms and formation of hole parts are more easily achieved.

The metal atoms may contain at least one selected from the group consisting of transition metals, alkaline earth metals, and aluminum. When the metal atoms contain at least one selected from the above-mentioned metal atoms, it is easier to provide opening parts in the carbon-containing layer.

The transition metal may contain at least one kind of metal atoms selected from the group consisting of iron, copper, cobalt, vanadium, nickel, zinc, and lanthanides. When the metal atoms include at least one kind selected from the above-mentioned metal atoms, it is easier to provide opening parts in the carbon-containing layer.

The carbon-containing layer may be a monomolecular layer.

The carbon-containing layer may contain at least one selected from the group consisting of graphene and graphene oxide.

The metal complex may include a complex of at least one selected from phthalocyanine, porphine, porphyrin, corrole, chlorin, and derivatives thereof, and a metal atom. When the metal complex includes a complex of the phthalocyanine or the like and a metal atom, it is easy to arrange the metal complex on the carbon-containing layer with certain regularity.

A plurality of the solid bodies may be arranged on the carbon-containing layer.

A plurality of the solid bodies may be arranged regularly on the carbon-containing layer.

Advantageous Effects of Invention

According to the present disclosure, a carbon material having pores and having excellent mechanical strength, in which spreading of cracks or the like is suppressed, may be provided. According to the present disclosure, furthermore, a production method for producing a carbon material such as described above may be provided.

DESCRIPTION OF EMBODIMENTS

Figure 1:
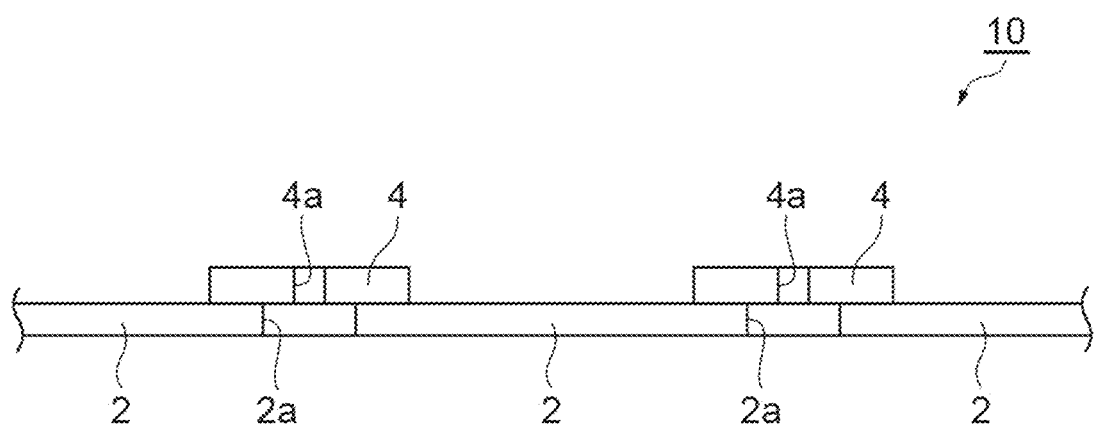
FIG. 1 is a schematic cross-sectional view illustrating an example of a carbon material.

In the following description, embodiments of the present disclosure will be described, with reference to the drawings depending on the circumstances. However, the following embodiments are examples for illustrating the present disclosure and are not intended to limit the present disclosure to the following matters. The positional relations such as up and down or right and left will be considered to be based on the positional relations shown in the drawings, unless particularly stated otherwise. The dimensional ratios of various elements are not limited to the ratios shown in the diagrams.

Regarding the materials mentioned as examples in the present specification, unless particularly stated otherwise, one kind can be used alone, or two or more kinds can be used in combination. Regarding the content of each component in the composition, when there are a plurality of substances corresponding to each component, unless particularly stated otherwise, the content means the total amount of the plurality of substances present in the composition.

An embodiment of the carbon material includes a carbon-containing layer having opening parts; and a solid body provided so as to cover the opening parts of the carbon-containing layer. Furthermore, the solid body has hole parts communicating with the opening parts. The form of the carbon material may be, for example, a film and a tubular body. End parts of the tubular body may be in an open state or may be in a closed state. When the end parts of the tubular body are in an equilibrium state, the end parts may be composed of the same element as that of the carbon-containing layer. An aggregate of the carbon material may be, for example, in a powder form.

FIG. 1 is a schematic cross-sectional view illustrating an example of the carbon material. A carbon material 10 has a carbon-containing layer 2 and a solid body 4. The carbon-containing layer 2 has a plurality of opening parts 2a, and the solid body 4 is provided so as to cover the opening parts 2a. Furthermore, the solid body 4 is provided on the opening parts 2a of the carbon-containing layer 2; however, since the solid body 4 also has hole parts 4a, the carbon material 10 has through-hole parts composed of the opening parts 2a carried by the carbon-containing layer 2; and the hole parts 4a carried by the solid body 3. The opening diameter of an opening part 2a is usually larger than the opening diameter of a hole part 4a. The opening part 2a and the hole part 4a refer to regions where the elements constituting the carbon-containing layer 2 and the elements constituting the solid body 4 are absent, respectively. In FIG. 1, only a portion of a cross-section is described; however, a plurality of the opening parts 2a may exist spreading in the in-plane direction of the carbon-containing layer 2, and the multiple opening parts 2a may exist regularly at predetermined intervals. Similarly, the solid body 4 may be such that a plurality of the solid bodies 4 are arranged to spread in the in-plane direction on the carbon-containing layer 2 and may be present such that a plurality of the solid bodies 4 may exist to be arranged regularly at predetermined intervals.

The carbon-containing layer 2 may be composed of, for example, a monomolecular layer or may be composed of a plurality of layers. The carbon-containing layer 2 is preferably composed of a monomolecular layer from the viewpoint of facilitating the control of the opening parts 2a. The carbon-containing layer 2 may contain, for example, at least one selected from the group consisting of graphene and graphene oxide, may be composed of at least one selected from the group consisting of graphene and graphene oxide, or may be formed from graphene or graphene oxide.

Graphene is a sheet-like compound in which hexagonal lattice structures composed of a plurality of carbon atoms stretch out in a row. Graphene is not particularly limited; however, examples include graphite in which a plurality of graphene sheets are stacked; a cylindrical-shaped carbon nanotube composed of one sheet or a plurality of graphene sheets (for example, Single-Walled Carbon Nanotube: SWCNT, or the like), and a cone-shaped carbon nanohorn obtained by closing a tip of a carbon nanotube (for example, Single-Walled Carbon Nanohorn: SWCNH, or the like). From the viewpoint of facilitating control of the opening parts 2a, the graphene or the like is preferably at least one selected from the group consisting of a single-layer graphite, a single-walled carbon nanotube, and a single-walled carbon nanohorn. Graphene oxide is a compound obtained by introducing various oxygen-containing functional groups such as an epoxy group, a carboxyl group, a carbonyl group, and a hydroxyl group into graphene, and graphene oxide may also be referred to as graphene having the above-described oxygen-containing functional groups.

The thickness of the monomolecular layer of the graphene is generally 0.2 to 0.3 nm. The diameter of the carbon nanotube may be, for example, 0.5 to 40 nm, 0.4 to 1.0 nm, or 0.6 to 5.0 nm. The length of the carbon nanotube may be, for example, 10 to 5000000 nm, 20 to 2000000 nm, or 100 to 1000000 nm. The diameter of the carbon nanohorn may be, for example, 2 to 5 nm, 1 to 3 nm, or 2 to 4 nm. The length of the carbon nanohorn may be, for example, 40 to 50 nm, 20 to 40 nm, or 30 to 60 nm. The thickness of the monomolecular layer of the graphene, the diameter and length of the carbon nanotube, and the diameter and length of the carbon nanohorn mean values measured by electron microscopy.

The opening diameter of the opening parts 2a carried by the carbon-containing layer 2 may be appropriately adjusted according to the use application and the like of the carbon material. The upper limit value of the opening diameter of the opening parts 2a carried by the carbon-containing layer 2 may be, for example, less than 5 nm, less than 3 nm, less than 2 nm, or less than 1 nm. The lower limit value of the opening diameter of the opening parts 2a carried by the carbon-containing layer 2 may be, for example, greater than 0.3 nm, greater than 0.5 nm, or greater than 0.7 nm. The opening diameter of the opening parts 2a carried by the carbon-containing layer 2 may be adjusted in the above-mentioned range, and the opening diameter may be, for example, greater than 0.7 nm and less than 2 nm. The opening diameter of the opening parts 2a carried by the carbon-containing layer 2 may be controlled by, for example, adjusting the conditions for an oxidation treatment for the carbon-containing layer (for example, heating temperature and heating time), and the like. The opening diameter of the opening parts 2a carried by the carbon-containing layer 2 may be more easily adjusted by, for example, performing an oxidation treatment for the carbon-containing layer using ammonium nitrate in a vacuum environment at a relatively low temperature of 280° C. or lower. The opening parts 2a are regions where the elements constituting the carbon-containing layer 2 do not exist (may also be referred to as defect parts), and for example, when the carbon-containing layer 2 is a monomolecular layer of graphene, the opening parts 2a may be defect parts where a portion of the carbon atoms constituting the monomolecular layer have been removed. At the defect parts, usually a proton (—H), an oxygen atom (═O), a hydroxyl group (—OH), and the like are introduced in place of the removed carbon atoms.

The solid body 4 may be, for example, a compound having a planar structure, may be a π-conjugated macrocyclic compound having a planar structure, and may be a π-conjugated macrocyclic heterocyclic compound having a planar structure. For example, the carbon material 10 of the present disclosure may be a material that includes a carbon-containing layer 2 having opening parts 2a (for example, a single-layer graphite, a single-walled carbon nanotube, a single-walled carbon nanohorn, and the like) and a π-conjugated macrocyclic compound provided so as to cover the opening parts 2a of the carbon-containing layer 2, in which the π-conjugated macrocyclic compound is disposed such that the void possessed by the π-conjugated macrocyclic compound in the molecule is disposed on each of the opening parts 2a. The carbon material 10 is such that since expansion of the opening parts 2a carried by the carbon-containing layer 2 is suppressed by having the solid body 4, the carbon material 10 has superior mechanical strength compared to a carbon-containing layer having opening parts but having no solid body 4 (for example, a conventional graphene sheet having perforations).

Specifically, the solid body 4 may contain at least one selected from the group consisting of phthalocyanine, porphine, porphyrin, corrole, chlorin, and derivatives thereof, and may be at least one selected from the group consisting of phthalocyanine, porphine, porphyrin, corrole, chlorin, and derivatives thereof. Whether the solid body 4 contains the above-described compounds may be checked using the ultraviolet-visible light absorption spectrum, and more specifically, it may be checked by measuring peaks in the Soret band (region corresponding to a wavelength near 400 nm). Meanwhile, the phthalocyanine and the like in the free state exhibit strong absorption in the Q band (region corresponding to a wavelength of 600 to 900 nm) in the ultraviolet-visible light absorption spectrum; however, when joined to the carbon-containing layer 2 (for example, graphene or the like), absorption in the Q band is decreased, and therefore, detection is difficult in the examination using the Q band.

Examples of the derivatives of phthalocyanine include a compound represented by the following General Formula (1), naphthalocyanine, anthracocyanine, and azulenocyanine. The phthalocyanine derivative is preferably a compound represented by the following General Formula (1), from the viewpoint of further enhancing the strength of joining to the carbon-containing layer 2 (for example, joining by π-stacking, or the like).

[Chemical Formula 1]

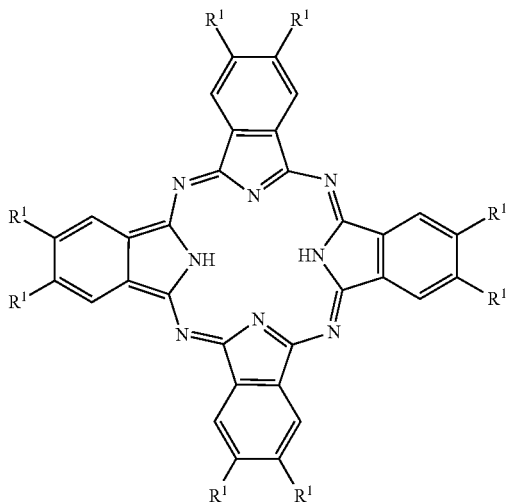

(1)

A plurality of $R^1$'s existing in General Formula (1) may be identical with or different from each other. In General Formula (1), $R^1$ may be, for example, an alkyl group, an alkoxy group, a polyoxyalkylene group, or the like. $R^1$ may be a linear, branched, or cyclic group but is preferably a linear group. The number of carbon atoms constituting $R^1$ may be adjusted according to the distance between the opening parts 2a carried by the carbon-containing layer 2. The number of carbon atoms constituting $R^1$ may be, for example, 5 to 12, 6 to 10, or 7 to 9. When $R^1$ includes a linear alkyl group having 5 to 12 carbon atoms, a linear alkoxy group having 5 to 12 carbon atoms, and a linear polyoxyalkylene group having 5 to 12 carbon atoms, since General Formula (1) may form a discotic liquid crystal, arranging the compound with certain regularity on the carbon-containing layer 2 may be achieved more easily.

Specific examples of phthalocyanine include 2,3,9,10,16,17,23,24-Octakis(octyloxy)-29H,31H-phthalocyaune.

Examples of the derivative of porphyrin include a compound represented by the following General Formula (2).

[Chemical Formula 2]

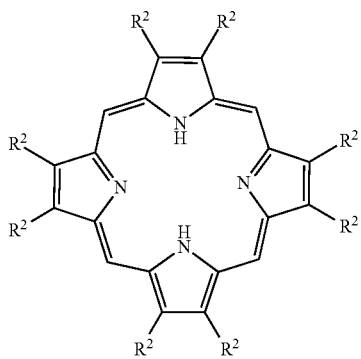

(2)

A plurality of $R^2$'s existing in General Formula (2) may be identical with or different from each other. In General Formula (2), may be, for example, an alkyl group, an alkoxy group, or a polyoxyalkylene group. $R^2$ may be a linear, branched, or cyclic group but is preferably a linear group. The number of carbon atoms constituting $R^2$ may be adjusted according to the distance between the opening parts 2a carried by the carbon-containing layer 2. The number of carbon atoms constituting $R^2$ may be, for example, 5 to 12, 6 to 10, or 7 to 9. When $R^2$ includes a linear alkyl group having 5 to 12 carbon atoms, a linear alkoxy group having 5 to 12 carbon atoms, and a linear polyoxyalkylene group having 5 to 12 carbon atoms, since General Formula (2) may form a discotic liquid crystal, arranging the compound with certain regularity on the carbon-containing layer 2 may be achieved more easily.

Examples of the corrole derivative include a compound represented by the following General Formula (3).

[Chemical Formula 3]

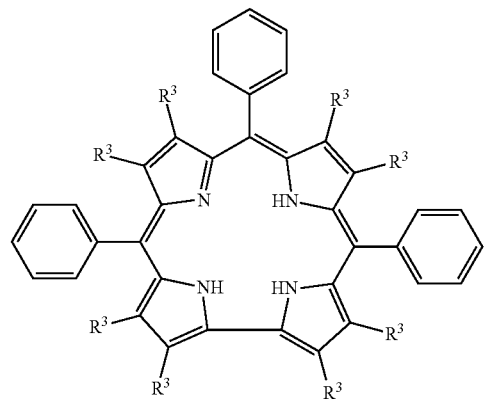

(3)

A plurality of $R^3$'s existing in General Formula (3) may be identical with or different from each other. In General Formula (3), $R^3$ may be, for example, an alkyl group, an alkoxy group, or a polyoxyalkylene group. $R^3$ may be a linear, branched, or cyclic group but is preferably a linear group. The number of carbon atoms constituting $R^3$ may be adjusted according to the distance between the opening parts 2a carried by the carbon-containing layer 2. The number of carbon atoms constituting $R^3$ may be, for example, 5 to 12, 6 to 10, or 7 to 9. When $R^3$ includes a linear alkyl group having 5 to 12 carbon atoms, a linear alkoxy group having 5 to 12 carbon atoms, and a linear polyoxyalkylene group having 5 to 12 carbon atoms, since General Formula (3) may form a discotic liquid crystal, arranging the compound with certain regularity on the carbon-containing layer 2 may be achieved more easily.

Examples of the chlorin derivative include a compound represented by the following General Formula (4).

[Chemical Formula 4]

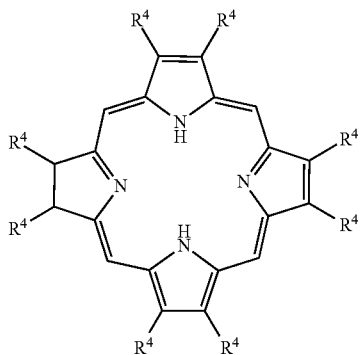

(4)

A plurality of R$^4$'s existing in General Formula (4) may be identical with or different from each other. In General Formula (4), R$^4$ may be, for example, an alkyl group, an alkoxy group, or a polyoxyalkylene group, R$^4$ may be a linear, branched, or cyclic group but is preferably a linear group. The number of carbon atoms constituting R$^4$ may be adjusted according to the distance between the opening parts 2a carried by the carbon-containing layer 2. The number of carbon atoms constituting R$^4$ may be, for example, 5 to 12, 6 to 10, or 7 to 9. When R$^4$ includes a linear alkyl group having 5 to 12 carbon atoms, a linear alkoxy group having 5 to 12 carbon atoms, and a linear polyoxyalkylene group having 5 to 12 carbon atoms, since General Formula (4) may form a discotic liquid crystal, arranging the compound with certain regularity on the carbon-containing layer 2 may be achieved more easily.

The hole part 4a carried by the solid body 4 means a region where the elements constituting the solid body 4 are not present. The hole part 4a carried by the solid body 4 is usually located on the opening part 2a of the above-mentioned carbon-containing layer 2. When the solid body 4 is, for example, at least one selected from the group consisting of phthalocyanine, porphine, porphyrin, corrole, chlorin, and derivatives thereof, the hole part 4a may be a region surrounded by four pyrrole rings and methylene groups (in the case of constituting a metal complex, the region where a metal element is located) in phthalocyanine, porphine, porphyrin, corrole, chlorin, and derivatives thereof. A plurality of solid bodies 4 included in the carbon material 10 may have metal atoms in the hole parts 4a in a portion of the solid body. Examples of the metal atom include transition metals, alkaline earth metals, and aluminum.

When the carbon-containing layer 2 includes at least one selected from the group consisting of graphene and graphene oxide, since the solid body 4 includes a compound having a π-conjugated system, joining between the carbon-containing layer 2 and the solid body 4 (for example, joining by π-stacking or the like) is easier.

The carbon material 10 has an excellent specific surface area since the carbon-containing layer 2 has opening parts 2a. When the carbon material 10 is in a film form (for example, the carbon-containing layer 2 is graphene or the like), the specific surface area may be in the following range. That is, the specific surface area of the carbon material 10 may be adjusted to, for example, 2000 m$^2$/g or more or 2500 m$^2$/g or more. The specific surface area of the carbon material 10 may be, for example, 2800 m$^2$/g or less or 2600 m$^2$/g or less. When the carbon material 10 is in the form of a tubular body (for example, the carbon-containing layer 2 is a carbon nanotube or a carbon nanohorn), the specific surface area of the carbon material 10 may be in the following range. The lower limit value of the specific surface area of the carbon material 10 may be adjusted to, for example, 300 m$^2$/g or more, 500 m$^2$/g or more, 700 m$^2$/g or more, 800 m$^2$/g or more, 1000 m$^2$/g or more, 1200 m$^2$/g or more, or 1400 m$^2$/g or more. The upper limit value of the specific surface area of the carbon material 10 may be, for example, 1600 m$^2$/g or less or 1500 m$^2$/g or less. When the lower limit value of the specific surface area of the carbon material 10 is in the above-described range, decrease in the mechanical strength may be more sufficiently suppressed. The specific surface area of the carbon material 10 may be adjusted in the above-mentioned range and may be, for example, 300 to 1600 m$^2$/g or 600 to 1500 m$^2$/g.

The specific surface area according to the present specification means a value determined according to a comparative plot method (particularly, $\alpha_S$-plot). More specifically, the surface area is determined by comparing a nitrogen adsorption isotherm measured at a temperature of 77 K with an adsorption isotherm obtainable for a standard sample having a known specific surface area. In the case of a carbon material, non-porous carbon is used as the standard sample. For the measurement of the specific surface according to the present specification, non-porous carbon manufactured by Mitsubishi Chemical Corp. is used. For the nitrogen adsorption isotherm, an adsorption analyzer (manufactured by Quantachrome Corp., product name: Autosorb-iQ) is used. Prior to measurement, a measurement sample is subjected to a treatment for 2 hours at a pressure of 1 mPa or less and a temperature of 150° C. using a preliminary treatment instrument attached the adsorption analyzer. An $\alpha_S$-plot is obtained by normalizing the nitrogen adsorption amount for a standard sample at a relative pressure of 0.4 to $\alpha_S=1$, and plotting the adsorption amount with respect to the normalized as. The specific surface area is a value calculated by the following formula, in which the gradient of the $\alpha_S$-plot of the sample to be measured is denoted by S (sample), the gradient of the $\alpha_S$-plot of a standard sample is denoted by S (standard sample), and the surface area of the standard sample is denoted by A (standard sample).

Specific surface area=$S$ (sample)÷$S$ (standard sample)×$A$ (standard sample)

Regarding the specific surface area, it is general to employ a value measured by the BET method. However, in the case of a porous body having a pore size at a nanometer level as in the case of a carbon nanotube, the BET method tends to estimate the surface area to be larger than the actual surface area. Therefore, in the present specification, the above-mentioned comparative plot method is employed as a method capable of determining the specific surface area more accurately.

The pore volume can be calculated by using the comparative plot method. When the gradient of a linear region in the $\alpha_S$-plot in a region with a smaller value of $\alpha_S$ is different from the gradient in a region with a larger value of $\alpha_S$, it is implied that the sample has pores. From the gradient in the region with a smaller value of $\alpha_S$, the value of the specific surface area of the sample is obtained from the above-described formula, and from the gradient in the region with a larger value of $\alpha_S$, the value of the outer surface area of the sample is obtained. When the intersection point between a straight line in the region with a larger value of $\alpha_S$ and the Y-axis of the $\alpha_S$-plot (representing the adsorption amount), that is, the value of the Y-intercept is interpreted as the adsorption amount of molecules adsorbed to the inner part of the pores. When the value of the Y-intercept is designated as W (pore adsorption), in the case of nitrogen adsorption measurement at 77 K, the pore volume is a value calculated by the following formula.

Pore volume=W (adsorption amount)÷(density of liquid nitrogen)

Here, the density of liquid nitrogen is determined by performing calculation using the value of 0.808 g/mL.

The above-mentioned carbon material 10 may be produced by, for example, a method such as described below. An embodiment of the method for producing a carbon material has a first step of preparing a dispersion liquid including a carbon-containing layer, a metal complex, and a solvent, reducing the content of the solvent from the dispersion liquid, and thereby forming a complex in which the metal complex adheres to the surface of the carbon-containing layer; a second step of heat-treating the composite and providing opening parts in the carbon-containing layer in the vicinity of the metal atoms constituting the metal complex; and a third step of removing at least a portion of the metal atoms constituting the metal complex to form a solid body having hole parts communicating with the opening parts.

The first step is a step in which during a process of dispersing a carbon-containing layer and a metal complex in a solvent and reducing the content of the solvent, the metal complex is caused to adhere to the surface of the carbon-containing layer by utilizing the intermolecular force between the carbon-containing layer and the metal complex. In the present step, an oxidation reaction proceeds as a subsequent process in the part where the metal complex has adhered to the carbon-containing layer, more specifically, the regions located in the vicinity of the metal atoms constituting the metal complex. That is, the present step may control the positions where opening parts are provided in the carbon-containing layer.

The carbon-containing layer may be, for example, composed of a monomolecular layer or may be composed of a plurality of layers. The carbon-containing layer may be preferably a monomolecular layer. The carbon-containing layer may contain, for example, at least one selected from the group consisting of graphene and graphene oxide and may be formed from at least one selected from the group consisting of graphene and graphene oxide. The carbon-containing layer may be formed from graphene or graphene oxide.

The metal complex may contain a compound in which a metal atom is coordinated by the compound constituting the above-mentioned solid body 4. The metal complex may include, for example, a complex of at least one selected from phthalocyanine, porphine, porphyrin, corrole, chlorin, and derivatives thereof, and a metal atom. That is, the metal complex may include, for example, at least one selected from the group consisting of a metal phthalocyanine compound, a metal porphine compound, a metal porphyrin compound, a metal corrole compound, a metal chlorin compound, and derivatives thereof, and may be at least one selected from the group consisting of a metal phthalocyanine compound, a metal porphine compound, a metal porphyrin compound, a metal corrole compound, a metal chlorin compound, and derivatives thereof.

The distance between the opening parts provided in the carbon-containing layer may be adjusted through the selection of the metal complex. For example, when a metal complex composed of a derivative of phthalocyanine and a metal atom is used, the distance between the opening parts to be formed tends to be widened in the order of phthalocyanine, naphthalocyanine, and anthracocyanine. Furthermore, for example, when the compound represented by General Formula (1) described above is employed as the derivative of phthalocyanine, and a metal complex composed of the compound and a metal atom is used, as the number of carbon atoms constituting $R^1$ in General Formula (1) is larger, the distance between the opening parts to be formed tends to be widened. Furthermore, through the selection of $R^1$ in General Formula (1), it is easier to control the order of arrangement between the metal complexes, and opening parts may also be provided regularly in the carbon-containing layer. The reason why such an effect is obtained is not necessarily clear; however, the present inventors speculate that it is because the compound represented by General Formula (1) is a compound capable of forming a discotic liquid crystal phase and contributes to the control of the mutual position.

The metal atom constituting the metal complex is, for example, an element that promotes an oxidation reaction of the carbon-containing layer in a subsequent process. The metal atom constituting the metal complex may include, for example, at least one selected from the group consisting of transition metals, alkaline earth metals, and aluminum; may be at least one selected from the group consisting of transition metals, alkaline earth metals, and aluminum; may be at least one selected from the group consisting of transition metals and alkaline earth metals; and may be at least one selected from the group consisting of transition metals. When the metal complex includes at least one selected from the above-mentioned metal atoms, it is easier to provide opening parts in the carbon-containing layer. The transition metals may be, for example, titanium, vanadium, chromium, manganese, iron, cobalt, nickel, copper, zinc, and the like, and may be vanadium, iron, cobalt, nickel, copper, zinc, and the like. The alkaline earth metals may be, for example, magnesium, strontium, barium, and the like. The lanthanides may be, for example, lanthanum, cerium, and the like.

Specific examples of the metal complex include Copper (II) 2,3,9,10,16,17,23,24-Octakis(octyloxy)-29H,31H-phthalocyanine.

As the solvent, a compound that may disperse the carbon-containing layer and the metal complex may be used. Examples of the solvent include organic solvents such as toluene, benzene, xylene, and normal hexane.

The method for preparing the dispersion liquid is not particularly limited; however, the dispersion liquid may be prepared by, for example, a method of performing an ultrasonication treatment. At the time of preparing the dispersion liquid, for example, the carbon-containing layer and the metal complex may be incorporated into the solvent, and then the mixture may be subjected to a dispersing treatment, or dispersion liquids in which the carbon-containing layer and the metal complex are respectively separately dispersed may be prepared and then mixed. The lower limit value of the dispersing time for preparing the dispersion liquid (for example, the time for performing are ultrasonication treatment) may be 10 hours or more, 15 hours or more, or 24 hours or more. The upper limit value of the dispersing time for preparing the dispersion liquid may be, for example, 50 hours or less or 30 hours or less. Regarding the temperature at which the dispersion liquid is prepared, the preparation may be carried out while controlling the temperature. The upper limit value of the temperature at which the dispersion liquid is prepared may be, for example, 40° C. or lower, 30°

C. or lower, or 25° C. or lower. The lower limit value of the temperature at which the dispersion liquid is prepared may be, for example, 15° C. or higher or 20° C. or higher.

With regard to the dispersion liquid, the lower limit value of the content of the metal complex may be, for example, 5 parts by mass or more, 10 parts by mass or more, 15 parts by mass or more, or 20 parts by mass or more, with respect to 100 parts by mass of the carbon-containing layer. The upper limit value of the content of the metal complex may be, for example, 40 parts by mass or less, 50 parts by mass or less, 60 parts by mass or less, or 65 parts by mass or less, with respect to 100 parts by mass of the carbon-containing layer. The content of the metal complex may be adjusted within the above-mentioned range and may be, for example, 5 to 40 parts by mass, 10 to 50 parts by mass, or 20 to 60 parts by mass, with respect to 100 parts by mass of the carbon-containing layer.

The method of reducing the content of the solvent in the dispersion liquid is not particularly limited; however, examples include a heating treatment. The temperature for the heating treatment is desirably 80° C. or lower and may be, for example, 30° C. to 80° C., 40° C. to 80° C., or 50° C. to 80° C. By adjusting the temperature for the heating treatment to 80° C. or lower, collapsing of the arrangement of a plurality of the metal complexes adhering onto the carbon-containing layer may be further suppressed. By adjusting the temperature for the heating treatment to 30° C. or higher, reduction of the content of the solvent is made easier, and thereby adhesin of the metal complex onto the carbon-containing layer may be made easier. More specifically, in the case of using carbon nanotubes and carbon nanohorns as the carbon-containing layer, a method of first filtering the dispersion liquid through a membrane filter, leaving the filter cake to stand in an oven set at a temperature of 30° C. to 80° C. and heating the filter cake is desirable. Furthermore, in the case of using graphene as the carbon-containing layer, a method of first taking out a solid body in the dispersion liquid and heat-treating the solid body on a hot plate at a temperature of 40° C. to 80° C. is desirable. The reduction of the content of the solvent may be carried out over a predetermined time, and the time may be, for example, 10 minutes or more, 120 minutes or more, 360 minutes or more, or 720 minutes or more. The reduction of the content of the solvent may be carried out, for example, for 800 minutes or less. The reduction of the content of the solvent may be adjusted to be within the above-mentioned treatment time and may be carried out, for example, for about 30 minutes.

The carbon-containing layer may be provided on a base material of a metal foil (for example, copper foil). That is, the carbon-containing layer may be provided by bringing the above-mentioned dispersion liquid into contact with the base material by application or the like to form a liquid film of the dispersion liquid and subsequently reducing the content of the solvent in the liquid film. By using a base material, handleability of the carbon-containing layer during the production process may be enhanced. Meanwhile, a sheet composed of the carbon material is formed when the carbon-containing layers line up on the base material; however, when a metal complex is not used, this sheet usually has defects. For example, the sheet may have nicks, cracks, and the like. However, when a metal complex is used, the metal complex is coordinated in the gaps formed between the carbon-containing layers, and the occurrence of defects such as described above may be reduced.

The second step is a step of heat-treating a composite, which is the carbon-containing layer having the metal complex adhered to the surface, and then providing opening parts in the carbon-containing layer by an oxidation reaction in the vicinity of the metal atoms.

The lower limit value of the heating temperature fir the second step may be, for example, 200° C. or higher, 250° C. or higher, or 300° C. or higher. When the lower limit value of the heating temperature is adjusted to be within the above-described range, it is easier to form the opening parts in the carbon-containing layer. The upper limit value of the heating temperature for the second step may be, for example, 450° C. or lower, 430° C. or lower, or 400° C. or lower. When the upper limit value of the heating temperature for the second step is adjusted to be in the above-described range, excessive widening of the opening parts may be further suppressed, and the occurrence of the formation of opening parts by combustion at positions where metal atoms are absent may be further suppressed. The heating temperature for the second step may be adjusted in the above-mentioned range, and the heating temperature may be, for example, 200° C. to 450° C., 250° C. to 430° C., or 250° C. to 400° C.

The time for the heating treatment for the second step may be adjusted according to the heating temperature and the like such that, for example, when the heating treatment is performed at a relatively high temperature, the heating time may be shortened, and even when the heating treatment is performed at a relatively low temperature, the opening parts may be formed by sufficiently taking the heating time. The lower limit value of the heating treatment time for the second step may be, for example, 5 minutes or more, 10 minutes or more, or 30 minutes or more. The lower limit value of the heating treatment time for the second step may be, for example, 24 hours or less, 20 hours or less, 15 hours or less, or 10 hours or less. The heating time according to the present specification means the time taken from a point when an object of the heating treatment, after having reached a predetermined temperature, to be maintained at that temperature (retention time).

The second step may be a step of heat-treating the composite in air but is preferably a step of performing a heating treatment of the composite in an atmosphere including oxygen. The atmosphere including oxygen (mixed gas atmosphere) may include, for example, nitrogen and the like in addition to oxygen. The mixed gas preferably includes oxygen and nitrogen. The lower limit value of the content of oxygen in the mixed gas atmosphere may be 15% by volume or more, 20% by volume or more, or 25% by volume or more, based on the total amount of the mixed gas. The upper limit value of the content of oxygen in the mixed gas atmosphere may be 50% by volume or less, 40% by volume or less, or 30% by volume or less, based on the total amount of the mixed gas.

The second step may be a step that is carried out in a vacuum. In this case, ammonium nitrate may be used as an oxygen source. Since it is possible to lower the heating treatment temperature by using ammonium nitrate, control of the reaction system is more easily achieved. Specifically, when the composite is allowed to be co-present with ammonium nitrate and heat-treated at 200° C. to 280° C. in a vacuum, ammonium nitrate is decomposed, and oxygen may be generated. As the oxygen and the metal element in the composite are intercalated, opening parts may be provided in the carbon-containing layer in the vicinity of the metal atoms constituting the metal complex.

The third step is a step of providing opening parts in the carbon-containing layer, subsequently removing at least a portion of the metal atoms from the metal complex, and providing a solid body having hole parts communicating with the opening parts.

The method for removing the metal atoms in the third step is not particularly limited; however, for example, the removal may be carried out by an acid treatment. That is, the third step may be a step of removing at least a portion of the metal atoms by an acid treatment. When the third step is carried out by an acid treatment, removal of the metal atoms and formation of the hole parts are more easily achieved.

The above-mentioned method for producing a carbon material may have other steps in addition to the first step, the second step, and the third step. Regarding the other steps, for example, the method may have a step of providing a support film on the carbon-containing layer, a step of removing the base material, a step of providing water-permeable holes in the support film, and the like. The support film may be composed of, for example, a photoresist and may be a negative type photoresist. As the support film is composed of a photoresist, the water-permeable holes may be formed more easily in a subsequent step.

Another embodiment of the method for producing a carbon material has a step of vapor-depositing a metal complex to a carbon-containing layer containing graphene to form a composite having the metal complex adhered to the carbon-containing layer, instead of the above-mentioned first step. The other steps may be similar to those of the above-mentioned production method. The vapor deposition according to the present embodiment may be carried out by, for example, a cluster ion beam vapor deposition method. Regarding the conditions employed at this time, the ionization electron voltage, the ion beam current, the degree of vacuum, and the like may be regulated. The ionization electron voltage may be, for example, 300 V or higher. The ion beam current may be, for example, 300 mA or greater. The degree of vacuum may be, for example, $1 \times 10^{-2}$ mPa or less. According to the method according to the present embodiment, since a carbon material may be produced without using a solvent, production of a carbon material may be carried out more conveniently than the previously disclosed production method.

Furthermore, still another embodiment of the method for producing a carbon material has, instead of the above-mentioned first step, a step of spreading a dispersion liquid including a metal complex and a solvent on water (for example, ultrapure water), forming a liquid film formed from the dispersion liquid, reducing the content of the solvent in the liquid film, forming a molecular layer containing the metal complex, subsequently scooping up the molecular layer onto a carbon-containing layer containing graphene, and thereby forming a composite having the metal complex adhered thereto. The other steps may be similar to those of the above-mentioned production methods. It may be said that the above-described step according to the present embodiment is a step of forming a carbon material composed of a metal complex on a carbon-containing layer containing graphene according to a Langmuir-Blodgett method. According to the method related to the present embodiment, a carbon material in which a metal complex is arranged more uniformly on a carbon-containing layer may be produced as compared to other production methods.

Thus, several embodiments have been described; however, the present disclosure is not intended to be limited to the above-described embodiments. Furthermore, the contents of description according to the above-mentioned embodiments are mutually applicable.

EXAMPLES

Hereinafter, the matters of the present disclosure will be described in more detail with reference to Examples and Comparative Examples. However, the present disclosure is not intended to be limited to the following Examples.

Example 1

1 rug of single-walled carbon nanohorns and 5 mL of toluene were measured into a container, the mixture was subjected to a dispersing treatment using an ultrasonic cleaning machine for 15 minutes under the conditions of 25° C., and thus a dispersion liquid A of single-walled carbon nanohorns was prepared. Next, 0.5 mg of copper phthalocyanine (Copper(II) 2,3,9,10,16,17,23,24-Octakis(octyloxy)-29H,31H-phthalocyanine) and 10 mL of toluene were measured into a container, the mixture was subjected to a dispersing treatment using an ultrasonic cleaning machine for 15 minutes under the conditions of 25° C., and thus a dispersion liquid B of copper phthalocyanine was prepared.

The entire amounts of the dispersion liquid A and the dispersion liquid B prepared as described above were mixed, the mixture was subjected to a dispersing treatment using an ultrasonic cleaning machine for 24 hours under the conditions of 25° C., and thus a dispersion liquid C was prepared. After the dispersing treatment, the dispersion liquid C was filtered through a membrane filter, and single-walled carbon nanohorns having copper phthalocyanine supported thereon (corresponding to a carbon-containing layer having a metal complex adhered thereto) was obtained as a filter cake. The obtained single-walled carbon nanohorns having copper phthalocyanine supported thereon were dried for 2 hours under the conditions of 80° C. The amount of copper phthalocyanine in the filtrate filtered through a membrane filter was quantitatively determined using an ultraviolet-visible light spectrometer, the difference between the amount and the initial feed amount was calculated, and assuming that this difference was supported on the single-walled carbon nanohorns, the amount of supported copper phthalocyanine with respect to the single-walled carbon nanohorns was determined. The amount of supported copper phthalocyanine with respect to the single-walled carbon nanohorns was 1% by mass.

After drying, the single-walled carbon nanohorns having copper phthalocyanine supported thereon was left to stand still in a heating furnace and was heat-treated for one hour under the conditions of 300° C. (573 K) under a gas stream of a mixed gas of oxygen and nitrogen (mixed gas obtained by mixing oxygen and nitrogen at a volume ratio of 20% by volume:80% by volume) at a rate of 100 mL/min, and thereby perforated carbon nanohorns were prepared. This was used as a carbon material of Example 1. The rate of temperature increase was set to PC/min, and cooling was carried out by natural cooling.

Example 2

Perforated carbon nanohorns were prepared in the same manner as in Example 1, except that the amount of supported copper phthalocyanine with respect to the single-walled carbon nanohorns was set to 10% by mass.

Comparative Example 1

The dispersion liquid A prepared in Example 1 was filtered through a membrane filter, the single-walled carbon nanohorns obtained as a filter cake were dried for 2 hours under the conditions of 80° C., and the single-walled carbon nanohorns thus obtained were used as a carbon material of Comparative Example 1.

Comparative Example 2

The single-walled carbon nanohorns obtained in Comparative Example 1 were left to stand still in a heating furnace and were heat-treated for one hour under the conditions of 300° C. (573 K) under a gas stream of a mixed gas of oxygen and nitrogen (mixed gas obtained by mixing oxygen and nitrogen at a volume ratio of 20% by volume: 80% by volume) at a rate of 100 mL/min, and thereby perforated carbon nanohorns were prepared. These were used as a carbon material of Comparative Example 2. The rate of temperature increase was set to PC/min, and cooling was carried out by natural cooling.

<Evaluation of Carbon Material: Measurement of Ultraviolet-Visible Light Absorption Spectrum>

For each of the carbon materials prepared in Example 1 and Example 2, measurement of the ultraviolet-visible light absorption spectrum was carried out. The results are shown in FIG. 2 and FIG. 3.

Figure 2:
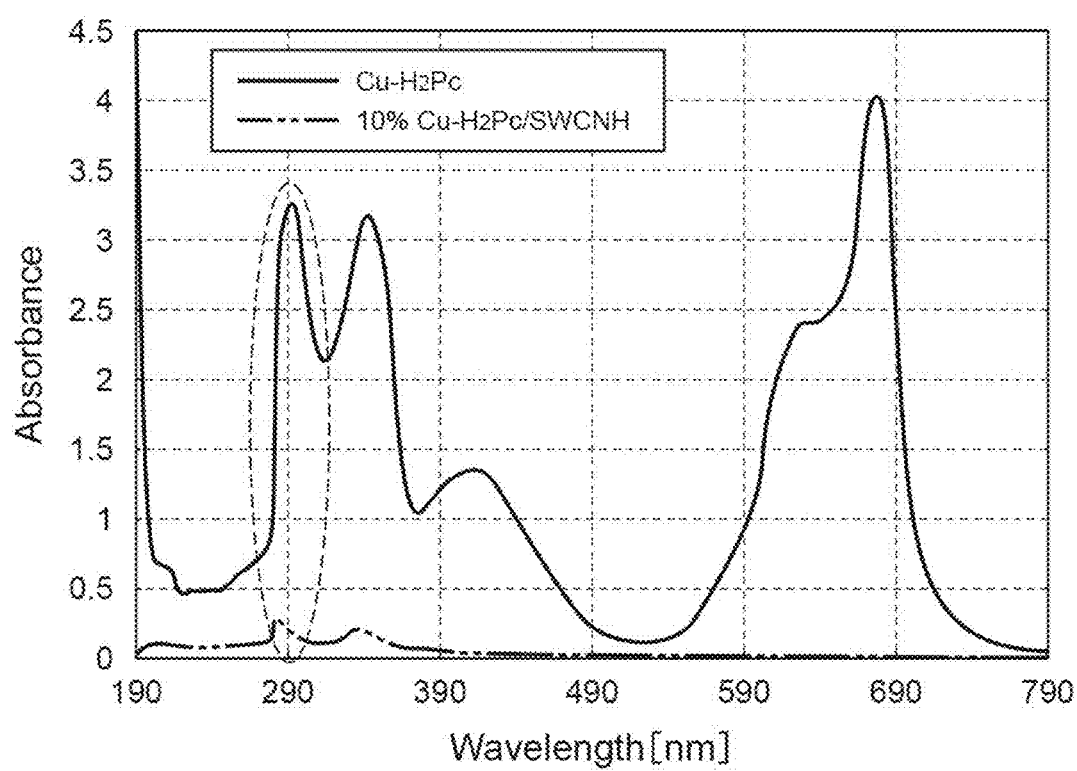
FIG. 2 is a graph showing the ultraviolet-visible light absorption spectrum of the carbon material prepared in Example 1.
Figure 3:
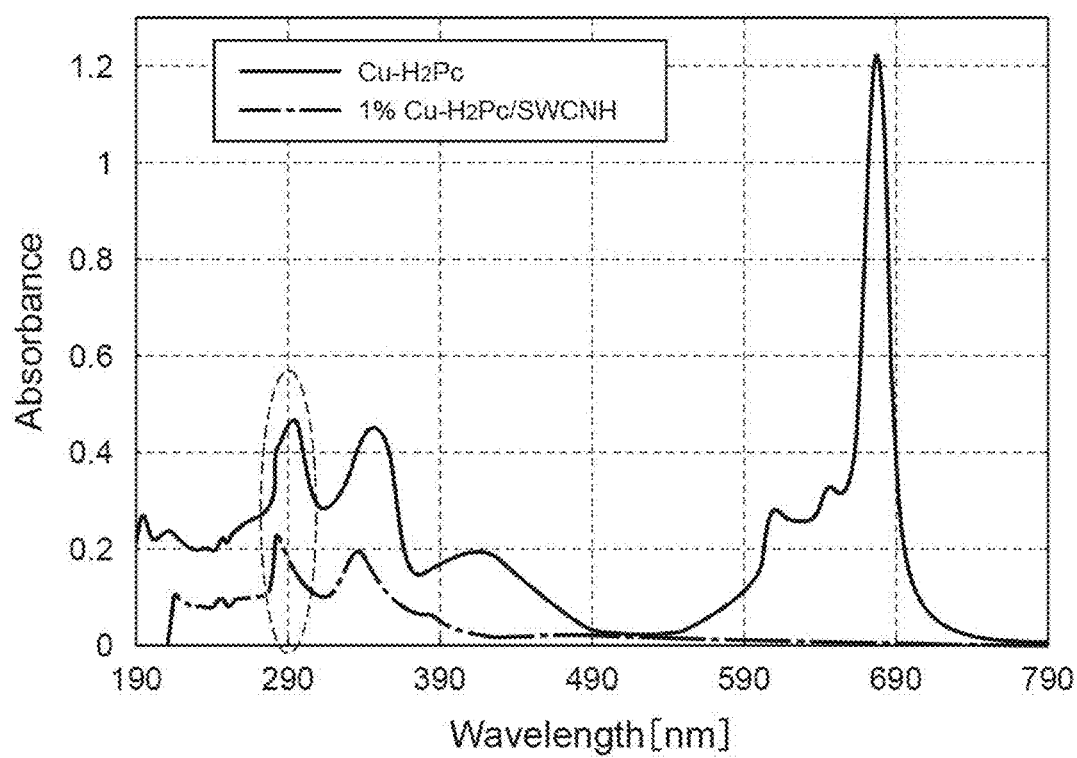
FIG. 3 is a graph showing the ultraviolet visible light absorption spectrum of the carbon material prepared in Example 2.

FIG. 2 is a graph showing the ultraviolet-visible light absorption spectrum of the carbon material prepared in Example 1. FIG. 3 is a graph showing the ultraviolet-visible light absorption spectrum of the carbon material prepared in Example 2. In FIG. 2 and FIG. 3, the ultraviolet-visible light absorption spectrum of the copper phthalocyanine used for the preparation of the carbon material is shown together for comparison. In the ultraviolet-visible light absorption spectra shown in FIG. 2 and FIG. 3, peaks originating from the phthalocyanine skeleton, which does not exist in the single-walled carbon nanohorns, were confirmed in the Soret band. Furthermore, it was confirmed that in the same ultraviolet-visible light absorption spectra, peaks of the Q band originating from the phthalocyanine skeleton do not exist. From these results, it was verified that copper phthalocyanine and single-walled carbon nanohorns are not simply present in mixture, and copper phthalocyanine is supported on the single-walled carbon nanohorns.

<Evaluation of Carbon Material: Thermogravimetry>

For each of the carbon materials prepared in Example 1 and Example 2, thermogravimetry was performed. The results are shown in FIG. 4 and FIG. 5.

Specifically, thermogravimetry was performed using a simultaneous differential scanning calorimetric and thermogravimetric apparatus (manufactured by Hitachi High-Technologies Corp., product name: STA7200). The rate of temperature increase was set to 1 K/min. Furthermore, for the measurement in an oxygen atmosphere, air was used, and the flow rate was adjusted to be 100 mL/min. Furthermore, for the measurement in a nitrogen atmosphere, pure nitrogen was used, and the flow rate was adjusted to be 100 mL/min.

Figure 4:
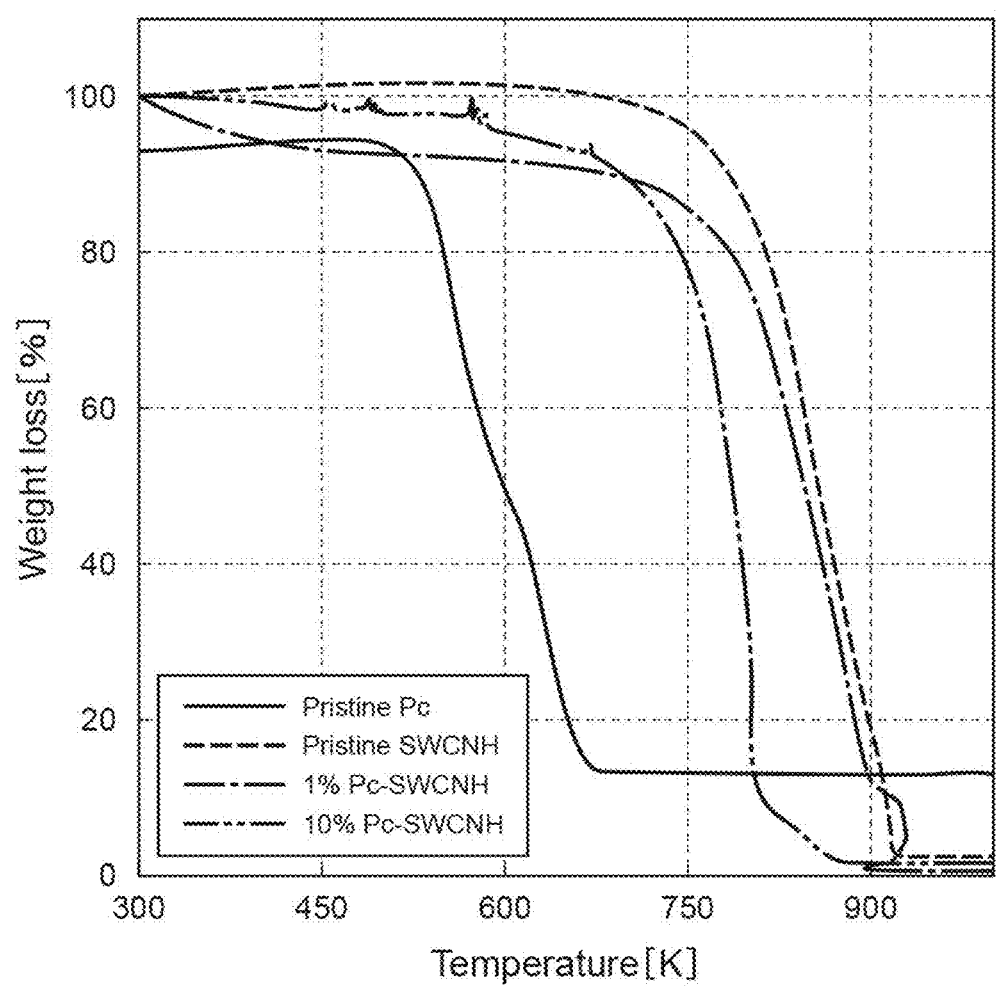
FIG. 4 is a graph showing the results of thermogravimetry of a carbon material in an oxygen atmosphere.
Figure 5:
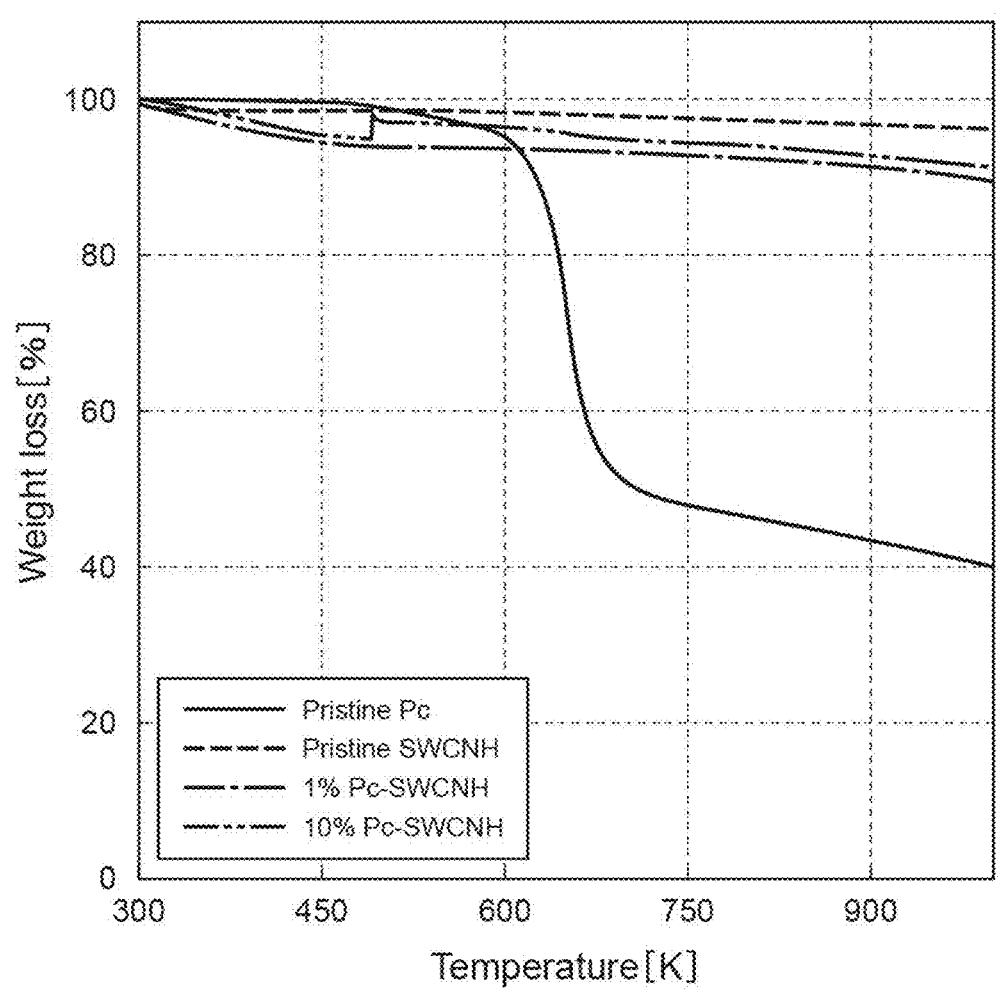
FIG. 5 is a graph showing the results of thermogravimetry of a carbon material in a nitrogen atmosphere.

FIG. 4 is a graph showing the results of thermogravimetry of the carbon materials in an oxygen atmosphere. FIG. 5 is a graph showing the results of thermogravimetry of the carbon materials in a nitrogen atmosphere. In FIG. 4, the results of performing the above-mentioned thermogravimetry for the copper phthalocyanine used for the preparation of the carbon materials and the single-walled carbon nanohorns prepared in Comparative Example 1 are shown together for comparison. From the graph shown in FIG. 4, it can be confirmed that based on the weight loss temperature of single-walled carbon nanohorns having no copper phthalocyanine supported thereon, as the amount of supported copper phthalocyanine increases, the initiation temperature of weight loss is lowered. From these results, it was confirmed that when copper phthalocyanine is supported, the perforation initiation temperature for the single-walled carbon nanohorns can be lowered. That is, it was verified that by supporting copper phthalocyanine, perforation can be performed under milder conditions, and the formation of opening parts can be controlled more easily. Furthermore, from the graph shown in FIG. 5, it was confirmed that single-walled carbon nanohorns exist stably in nitrogen, and a very small weight loss occurs. From these results, it was confirmed that the weight loss shown in FIG. 4 is attributable to an oxidation reaction of single-walled carbon nanohorns having oxygen intercalated therein.

<Evaluation of Carbon Material: Measurement of Nitrogen Adsorption Amount>

For each of the carbon materials prepared in Example 1, Example 2, Comparative Example 1, and Comparative Example 2, the nitrogen adsorption amount was measured using a fully automated gas adsorption amount analyzer (manufactured by Anton Paar Japan K.K., product name: Autosorb-iQ). The results are shown in FIG. 6.

Specifically, first, a pretreatment of a carbon material to be used as a sample was performed using an adsorption analyzer (manufactured by Quantachrome Corp., product name: Autosorb-iQ). Regarding the pretreatment, a degassing treatment for 2 hours at a temperature of 150° C. at a degree of vacuum of 1 mPa or less was performed using a pretreatment apparatus attached to the adsorption analyzer. Subsequently, the sample was transferred to a measuring unit, and the adsorption amount of nitrogen was measured using liquid nitrogen as a coolant under the conditions of a temperature of 77 K.

Figure 6:
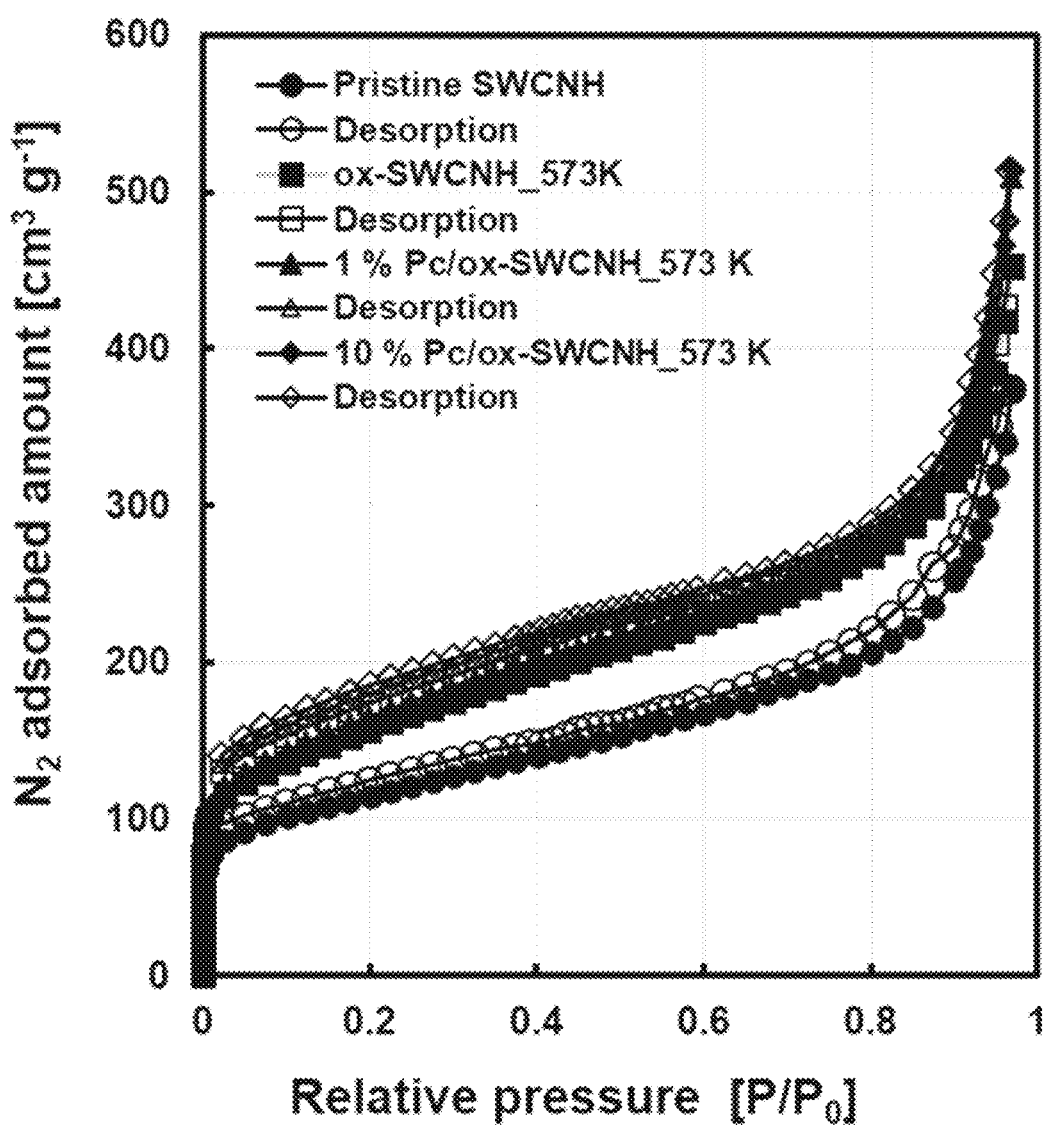
FIG. 6 is a graph showing the relationship between the nitrogen adsorption amount of a carbon material and the relative pressure of nitrogen.

FIG. 6 is a graph showing the relationship between the nitrogen adsorption amount of the carbon materials and the relative pressure of nitrogen. In FIG. 6, the results of adsorption of the carbon material prepared in Example 1 are indicated as "1% Pc/ox-SWCNH_573 K", the results of adsorption of the carbon material prepared in Example 2 are indicated as "10% Pc/ox-SWCNH_573 K", the results of adsorption of the single-walled carbon nanohorns prepared in Comparative Example 1 are indicated as "Pristine SWCNH", and the results of adsorption of the carbon material prepared in Comparative Example 2 are indicated as "ox-SWCNH_573 K". Furthermore, the results of desorption of nitrogen for the respective carbon materials are indicated by blank reference symbols.

As shown in FIG. 6, in Example 1, Example 2, and Comparative Example 2, in which a heating treatment was carried out, from a low stage of relative pressure (P/P$_0$), the nitrogen adsorption amount becomes larger as compared to the results of Comparative Example 1. From these results, it was verified that opening parts were provided in the single-walled carbon nanohorns obtained in Example 1, Example 2, and Comparative Example 2, nitrogen infiltrated into the inner part of the carbon nanohorns, and the surface in the inner part of the carbon nanohorns also contributed to adsorption.

<Evaluation of Carbon Material: Measurement of Gas Adsorption Amount>

For each of the carbon materials prepared in Example 1, Example 2, Comparative Example 1, and Comparative Example 2, the size of the opening diameter formed in the carbon material and the like were evaluated. The evaluation was carried out by performing measurement of the gas adsorption amount using argon (Ar, molecular size: 0.335 nm), which has a smaller molecule than nitrogen molecule (N₂, molecular size: 0.363 nm), and sulfur hexafluoride gas (SF₆, molecular size: 0.525 nm), which has a larger molecule than nitrogen molecule, and converting the value of pore volume determined using the measurement results for the nitrogen adsorption amount, to the gas adsorption amount per pore volume.

For the measurement of the argon adsorption amount and the hydrogen hexafluoride adsorption amount, the same adsorption analyzer (manufactured by Quantachrome Corp., product name: Autosorb-iQ) as that used for the above-mentioned nitrogen adsorption experiment was used. The pretreatment conditions were set to the same conditions as those for the nitrogen adsorption experiment. Regarding the conditions for measurement, a cell was immersed in an ice-water thermostatic bath, and measurement was performed under the conditions of a temperature of 273 K.

Figure 7:
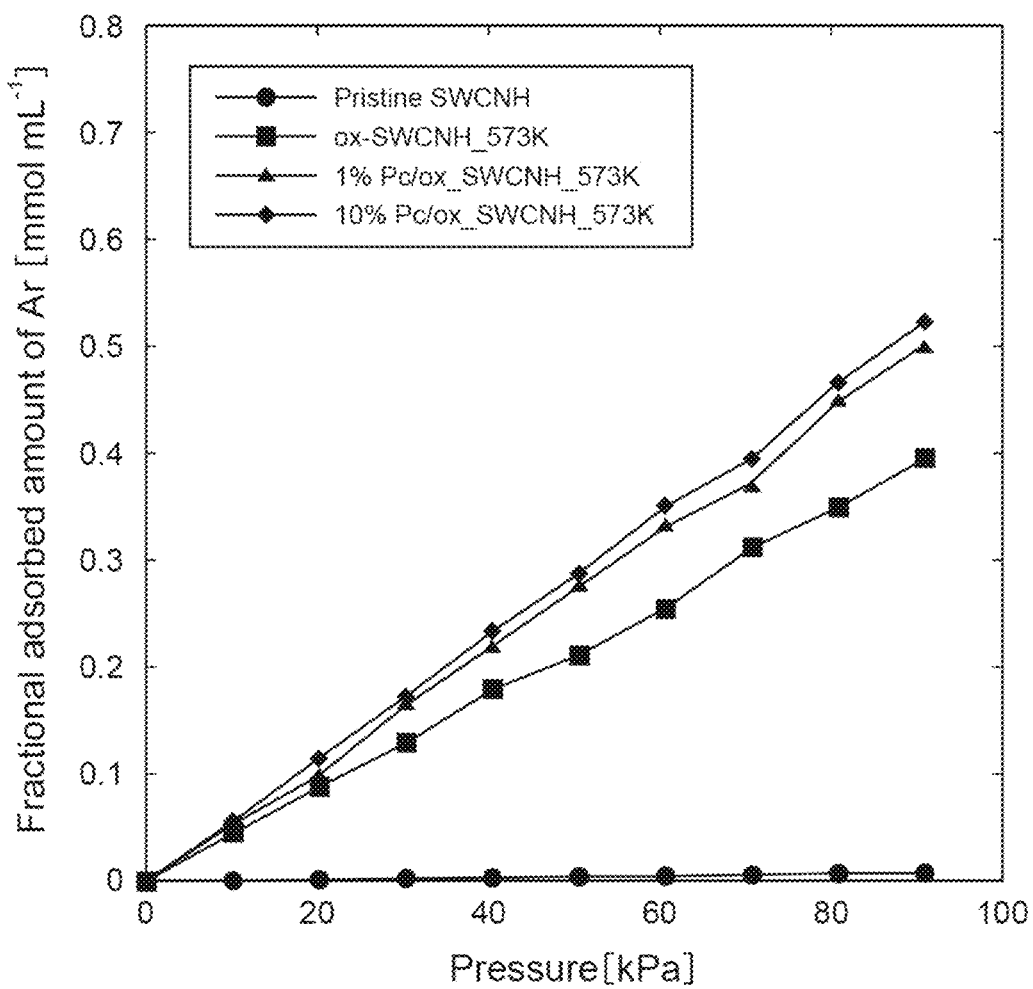
FIG. 7 is a graph showing the relationship between the argon adsorption amount per pore volume determined by nitrogen adsorption in a carbon material and the pressure of argon.
Figure 8:
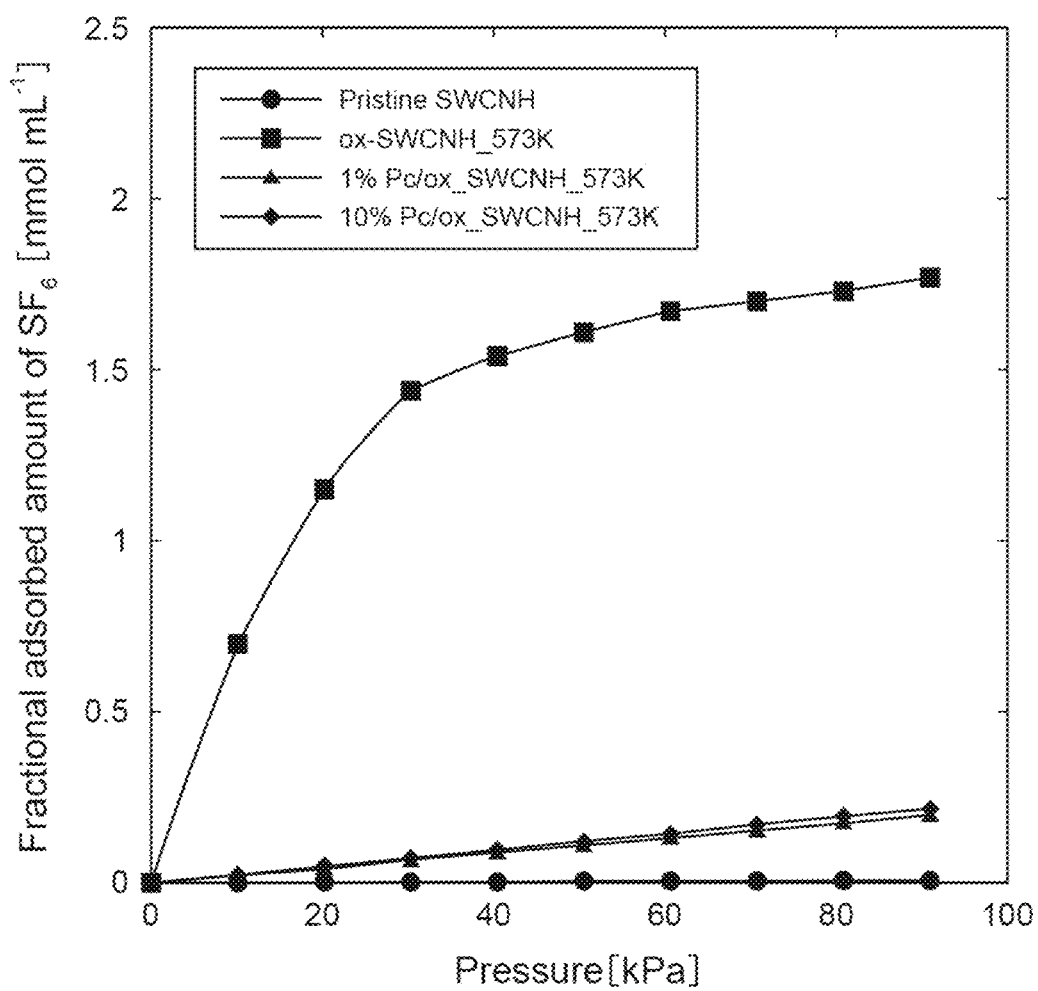
FIG. 8 is a graph showing the relationship between the sulfur hexafluoride adsorption amount per pore volume determined by nitrogen adsorption in a carbon material and the pressure of sulfur hexafluoride gas.

The results are shown in FIG. 7 and FIG. 8. FIG. 7 is a graph showing the relationship between the argon adsorption amount per pore volume determined by nitrogen adsorption of the carbon materials and the pressure of argon. FIG. 8 is a graph showing the relationship between the sulfur hexafluoride adsorption amount per pore volume determined by nitrogen adsorption of the carbon materials and the pressure of sulfur hexafluoride gas. In FIG. 7 and FIG. 8, the results of adsorption of the carbon material prepared in Example 1 are indicated as "1% Pc/ox-SWCNH_573 K", the results of adsorption of the carbon material prepared in Example 2 are indicated as "10% Pc/ox-SWCNH_573 K", the results of adsorption of the carbon material prepared in Comparative Example 1 are indicated as "Prisine SWCNH", and the results of adsorption of the carbon material prepared in Comparative Example 2 are indicated as "ox-SWCNH_537 K".

As shown in FIG. 7, the carbon materials of Example 1 and Example 2 are such that the adsorption amounts were smaller than that of the carbon material of Comparative Example 2 but increased. This is thought to mean that more holes have been formed in the carbon materials of Examples 1 and 2 than in the carbon material prepared in Comparative Example 2. This may also be confirmed from the fact that even in a comparison between Example 1 and Example 2, the carbon material of Example 2 in which the amount of the metal complex used was larger adsorbed more argon than the carbon material of Example 1. Furthermore, as shown in FIG. 8, in the single-walled carbon nanohorns of Comparative Example 2, the adsorption amount of sulfur hexafluoride is notably larger than the adsorption amount of sulfur hexafluoride in the carbon materials of Examples 1 and 2. This is thought to mean that the single-walled carbon nanohorns of Comparative Example 2 provided with openings have a large size of the opening parts, or during the formation of openings, cracks have been generated, causing splits in the carbon nanohorns. From the above-mentioned results, it was verified that according to the technology of the present disclosure, the number of openings and the like may be adjusted while controlling the opening diameter at the surface of the carbon material.

Example 3

A sample obtained by growing graphene (single layer) on a copper foil that measured 10 mm on each side (hereinafter, also described as graphene/copper foil; manufactured by Graphene Platform Corp.) was immersed for 5 minutes each in 10 mL of acetone, in 10 mL of methanol, and in 10 mL of ultrapure water in this order, thereby the sample was subjected to infiltration washing, and then the sample was dried. Next, 0.5 mg of copper phthalocyanine (Copper(II) 2,3,9,10,16,17,23,24-Octakis(octyloxy)-29H,31H-phthalocyanine) and 10 mL of toluene were measured into a container, the mixture was subjected to a dispersing treatment using an ultrasonic cleaning machine for 15 minutes under the conditions of 25° C., and thereby a dispersion liquid B2 of copper phthalocyanine was prepared.

The graphene/copper foil thus washed and dried was immersed in the dispersion liquid B2 and treated for one hour at 65° C., and thereby a monomolecular layer of copper phthalocyanine was formed on the graphene side of the graphene/copper foil. This sheet was cooled to a temperature of 40° C. or lower by natural cooling, the sheet was taken out from the dispersion liquid B2, washed with normal hexane, and then dried, and thus a sheet in which a monomolecular layer of copper phthalocyanine was provided on the graphene side of the graphene/copper foil was Obtained.

Next, the sheet was left to stand still in a heating furnace and was heat-treated for one hour under the conditions of 300° C. (573 K) under a gas stream of a mixed gas of oxygen and nitrogen (mixed gas obtained by mixing oxygen and nitrogen at a volume ratio of 20% by volume:80% by volume) at a rate of 100 mL/min to perforate the graphite, and opening parts were formed. This was used as a carbon material of Example 3. The rate of temperature increase was set to and cooling was carried out by natural cooling.

Example 4

A sheet in which a monomolecular layer of copper phthalocyanine was provided on the graphene side of graphene/copper foil was obtained in the same manner as in Example 3.

On the surface on the side where the monomolecular layer of copper phthalocyanine of the sheet was provided, 100 μL of an ethanol solution having a concentration of ammonium nitrate of 0.5 μmol/L was cast by dropping, and the solution was dried for one hour at 30° C. In this manner, a sample in which ammonium nitrate was adhered to the side where the monomolecular layer of copper phthalocyanine of the sheet was provided was produced.

Next, the above-mentioned sample having ammonium nitrate adhered thereto was left to stand still in a heating furnace, and under the conditions of 250° C. (523 K) in a vacuum. This was used as the carbon material of Example 4. The rate of temperature increase was set to 1° C./min, and cooling was carried out by natural cooling.

Figure 9:
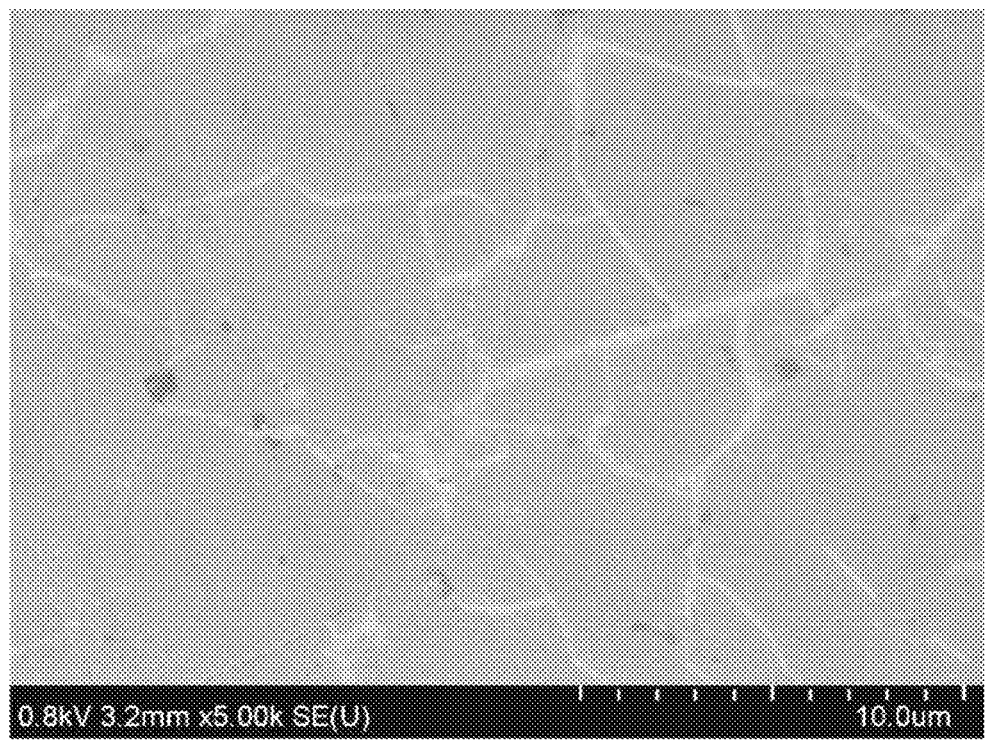
FIG. 9 is an electron microscopic image of a sheet surface in the production process for the carbon material according to Example 4.
Figure 9:
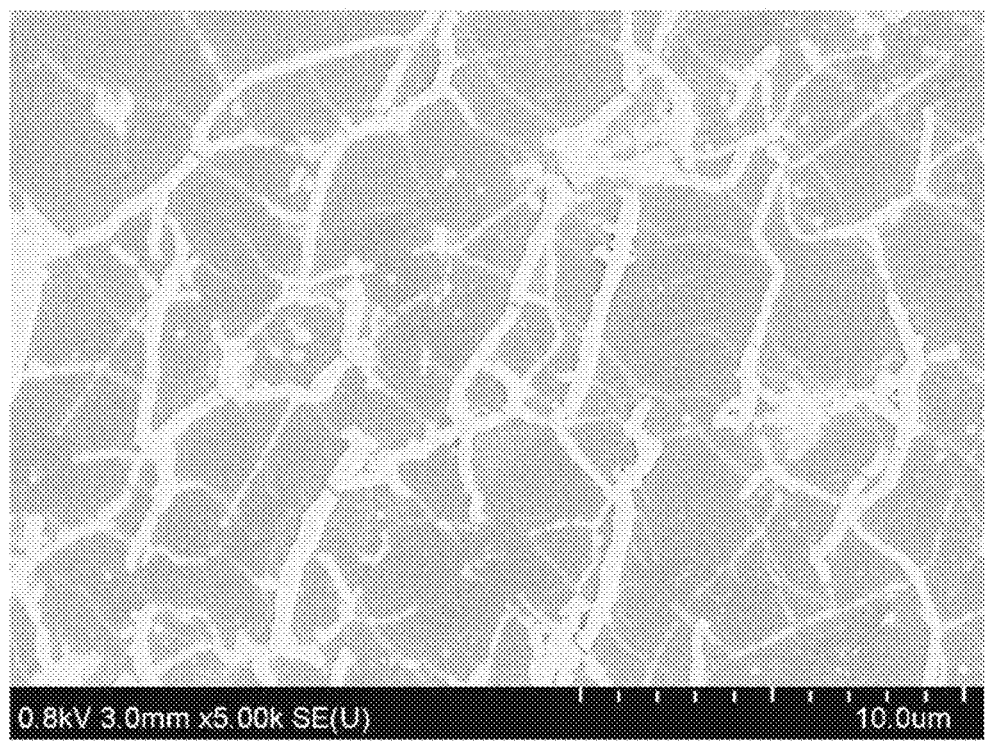

For reference, electron microscopic images of the sheet surface of the respective stages in the production process for the carbon material in Example 4 are shown in FIG. 9. FIG. 9(a) shows the surface of a sheet composed of graphite obtainable by casting on a copper foil and drying, and FIG. 9(b) shows the surface of a sheet that was subjected to a heating treatment at 250° C.

Comparative Example 3

Figure 10:
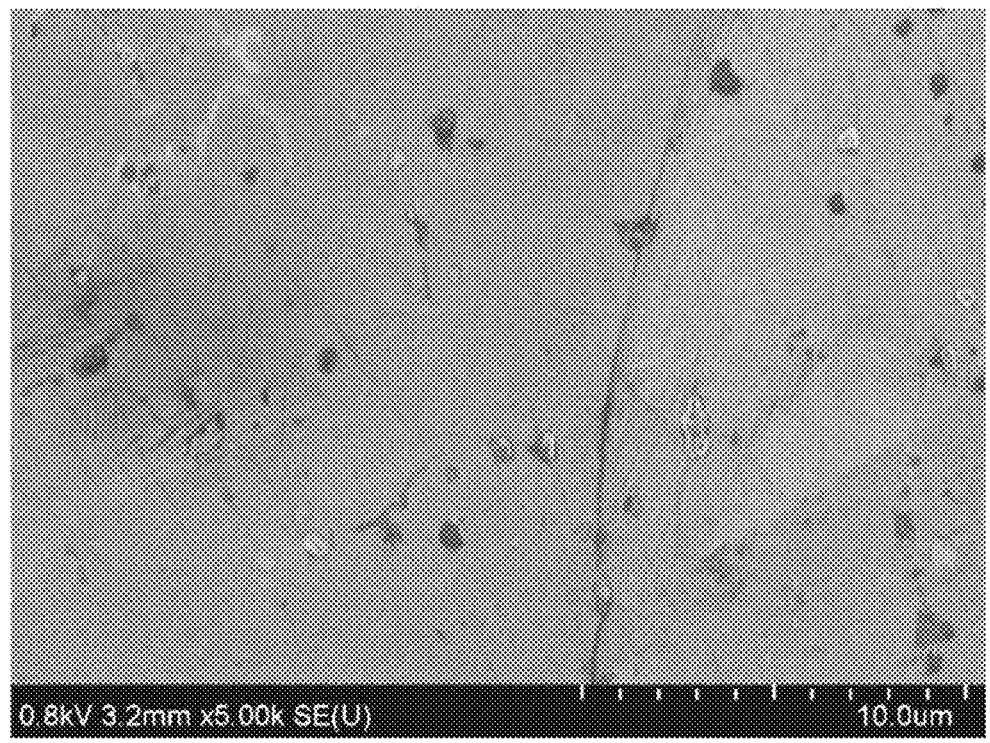
FIG. 10 is an electron microscopic image of a sheet surface in the production process for the carbon material according to Comparative Example 3.

A carbon material was prepared in the same manner as in Example 4, except that copper phthalocyanine was not used. An electron microscopic image of the sheet surface in the production process for the carbon material in Comparative Example 3 is shown in FIG. 10. FIG. 10 shows the surface of a sheet composed of graphite obtainable by casting on a copper foil and drying. It was confirmed that macrocracks were generated on the sheet because copper phthalocyanine was not used.

From the results shown in FIG. 10, it is understood that defects such as cracks may occur during the preparation process for a sheet. Also, as shown in FIG. 9(a), it was confirmed that when copper phthalocyanine was used, copper phthalocyanine and the like are disposed at the defect parts and fill the defects. Furthermore, as shown in FIG. 9(b), it was confirmed that even after perforation was provided on the graphite surface by being heat-treated, filling of defects by copper phthalocyanine and the like was maintained.

INDUSTRIAL APPLICABILITY

According to the present disclosure, a carbon material having pores and having excellent mechanical strength, in which spreading of cracks and the like is suppressed, may be provided. According to the present disclosure, a production method for producing a carbon material such as described above may be provided.

REFERENCE SIGNS LIST

2: carbon-containing layer; 2a: opening part; 4: solid body, 4a: hole part; 10; carbon material.

The invention claimed is:
1. A carbon material comprising:
a carbon-containing layer having opening parts; and
a plurality of solid bodies, each of the plurality of solid bodies provided so as to cover the opening parts of the carbon-containing layer;
wherein each of the plurality of solid bodies is joined by TT-stacking to the carbon-containing layer;
wherein each of the plurality of solid bodies has hole parts communicating with the opening parts; and
wherein each of the plurality of solid bodies comprises at least one selected from the group consisting of:
(i) a compound represented by the following General Formula (1),

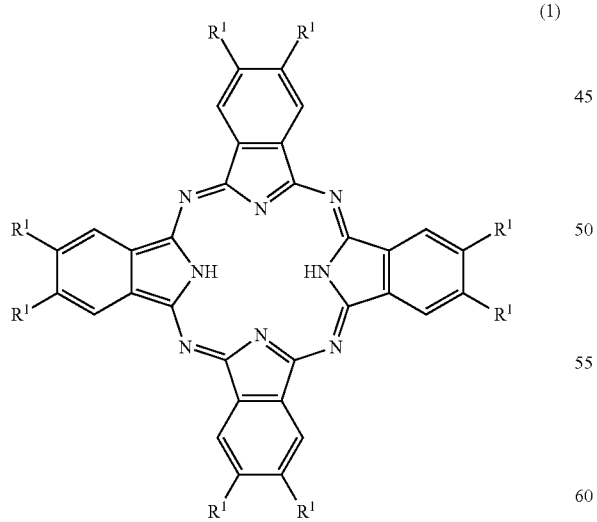

wherein each $R^1$ is an alkyl group, an alkoxy group, or a polyoxyalkylene group;
(ii) naphthalocyanine;
(iii) anthracocyanine;
(iv) azulenocyanine;
(V) a compound represented by the following General Formula (2),

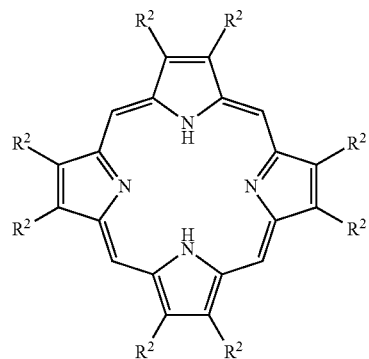

wherein each $R^2$ is an alkyl group, an alkoxy group, or a polyoxyalkylene group;
(vi) a compound represented by the following General Formula (3),

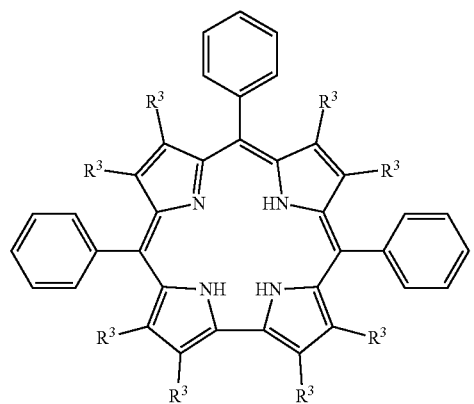

wherein each $R^3$ is an alkyl group, an alkoxy group, or a polyoxyalkylene group; or
(vii) a compound represented by the following General Formula (4),

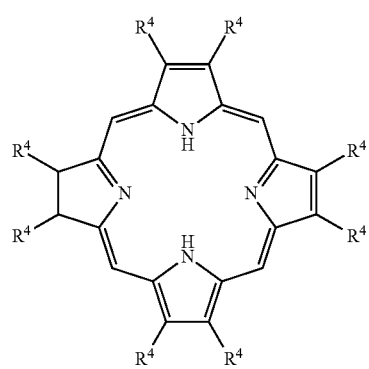

wherein each $R^4$ is an alkyl group, an alkoxy group, or a polyoxyalkylene group.

2. The carbon material according to claim 1, wherein the carbon-containing layer is a monomolecular layer.

3. The carbon material according to claim 1, wherein the carbon-containing layer comprises at least one selected from the group consisting of graphene and graphene oxide.

4. The carbon material according to claim 1, wherein the plurality of the solid bodies are arranged on the carbon-containing layer.

5. The carbon material according to claim 1, wherein the plurality of the solid bodies are arranged regularly on the carbon-containing layer.

6. A method for producing a carbon material, the method comprising:
- a first step of preparing a dispersion liquid including a carbon-containing layer, a plurality of metal complexes, and a solvent, reducing the content of the solvent, and thereby forming a composite having each of the plurality of metal complexes adhered to the surface of the carbon-containing layer,
  wherein each of the plurality of metal complexes is joined by π-stacking to the carbon-containing layer;
- a second step of heat-treating the composite and providing opening parts in the carbon-containing layer in the vicinity of the metal atoms constituting each of the plurality of metal complexes; and
- a third step of removing at least a portion of the metal atoms constituting each of the plurality of metal complexes and then forming a solid body having hole parts communicating with the opening parts;
- wherein each of the plurality of metal complexes includes a metal atom and a complex of at least one selected from the group consisting of:
  (i) a compound represented by the following General Formula (1),

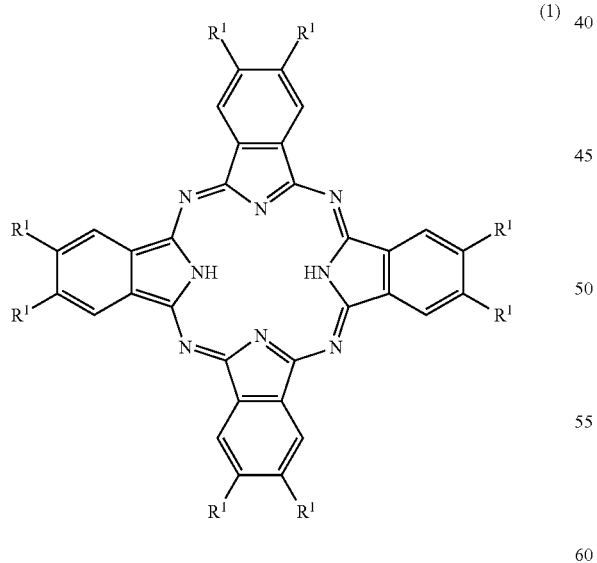

(1)

wherein each $R^1$ is an alkyl group, an alkoxy group, or a polyoxyalkylene group;
(ii) naphthalocyanine;
(iii) anthracocyanine;
(iv) azulenocyanine;
(v) a compound represented by the following General Formula (2),

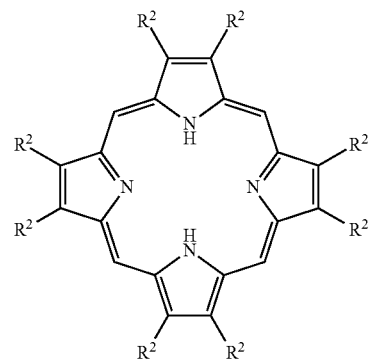

(2)

wherein each $R^2$ is an alkyl group, an alkoxy group, or a polyoxyalkylene group;
(vi) a compound represented by the following General Formula (3),

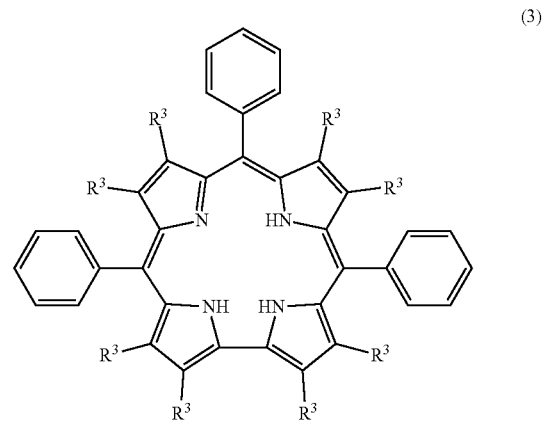

(3)

wherein each $R^3$ is an alkyl group, an alkoxy group, or a polyoxyalkylene group; or
(vii) a compound represented by the following General Formula (4),

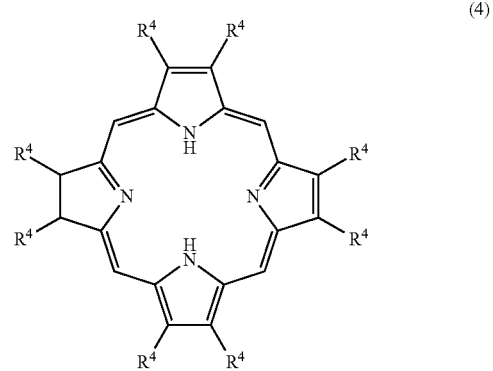

(4)

wherein each $R^4$ is an alkyl group, an alkoxy group, or a polyoxyalkylene group.

7. The method according to claim 6, wherein the heating temperature for the second step is 200° C. to 450° C.

8. The method according to claim 6, wherein the second step is a step of allowing the composite to be co-present with ammonium nitrate, heat-treating the mixture at 200° C. to 280° C. in a vacuum, and thereby providing opening parts in the carbon-containing layer in the vicinity of the metal atoms constituting each of the plurality of metal complexes.

9. The method according to claim 6, wherein the third step is a step of removing at least a portion of the metal atoms by an acid treatment.

10. The method according to claim 6, wherein the metal atom includes at least one selected from the group consisting of transition metals, alkaline earth metals, and aluminum.

11. The method according to claim 10, wherein the transition metals include metal atoms of at least one kind selected from the group consisting of vanadium, iron, cobalt, nickel, copper, zinc, and lanthanides.

12. The method according to claim 6, wherein the carbon-containing layer is a monomolecular layer.

13. The method according to claim 6, wherein the carbon-containing layer contains at least one selected from the group consisting of graphene and graphene oxide.

14. The method according to claim 6, wherein the plurality of metal complexes are arranged on the carbon-containing layer.

15. The method according to claim 6, wherein the plurality of metal complexes are arranged regularly on the carbon-containing layer.

16. The carbon material according to claim 1, wherein each $R^1$, $R^2$, $R^3$, and $R^4$ includes 5-12 carbon atoms.

17. The method according to claim 6, wherein each $R^1$, $R^2$, $R^3$, and $R^4$ includes 5-12 carbon atoms.

* * * * *